(12) United States Patent
Rapaka et al.

(10) Patent No.: US 11,714,882 B2
(45) Date of Patent: Aug. 1, 2023

(54) MANAGEMENT OF ATTRIBUTES ASSOCIATED WITH OBJECTS IN VIDEO DATA

(71) Applicant: DRAGONFRUIT AI, INC, Menlo Park, CA (US)

(72) Inventors: Arvind Rapaka, Menlo Park, CA (US); Amit Kumar, Menlo Park, CA (US)

(73) Assignee: DRAGONFRUIT AI, INC., Menlo Park, CA (US)

( * ) Notice: Subject to any disclaimer, the term of this patent is extended or adjusted under 35 U.S.C. 154(b) by 0 days.

(21) Appl. No.: 17/081,442

(22) Filed: Oct. 27, 2020

(65) Prior Publication Data

US 2022/0114385 A1     Apr. 14, 2022

Related U.S. Application Data

(60) Provisional application No. 63/089,920, filed on Oct. 9, 2020.

(51) Int. Cl.
| | | |
|---|---|---|
| G06V 20/40 | (2022.01) | |
| G06V 40/10 | (2022.01) | |
| G06V 40/20 | (2022.01) | |
| G06F 18/28 | (2023.01) | |
| G06F 18/2115 | (2023.01) | |

(52) U.S. Cl.
CPC .......... *G06F 18/28* (2023.01); *G06F 18/2115* (2023.01); *G06V 20/46* (2022.01); *G06V 20/48* (2022.01); *G06V 40/10* (2022.01); *G06V 40/20* (2022.01)

(58) Field of Classification Search
None
See application file for complete search history.

(56) References Cited

U.S. PATENT DOCUMENTS

| | | | | |
|---|---|---|---|---|
| 9,697,420 B2 * | 7/2017 | Takahashi | ............ | G06V 40/103 |
| 10,431,180 B1 * | 10/2019 | Sampath | ................ | G09G 5/001 |
| 10,482,333 B1 * | 11/2019 | el Kaliouby | ........... | G16H 20/70 |
| 2019/0197660 A1 * | 6/2019 | Kogure | ................ | H04N 23/698 |
| 2020/0285886 A1 * | 9/2020 | Jaber | ...................... | G06V 20/63 |
| 2021/0374649 A1 * | 12/2021 | Haldar | ........... | G06Q 10/063112 |

FOREIGN PATENT DOCUMENTS

| | | | | | |
|---|---|---|---|---|---|
| CN | 108540760 A | * | 9/2018 | ......... | H04L 63/0861 |
| CN | 105117296 B | * | 10/2018 | | |
| CN | 111310731 A | * | 6/2020 | ......... | G06K 9/00288 |
| WO | WO-2020049980 A1 | * | 3/2020 | ......... | G06K 9/00228 |

* cited by examiner

*Primary Examiner* — Mohammed Rachedine

(57) ABSTRACT

Systems, methods, and software described herein manage descriptive attributes associated with objects in video data. In one example, a video processing service obtains video data and identifies an object of interest in the video data. The video processing service further identifies attributes for the object of interest from the video data based on the attributes satisfying uniqueness requirements to differentiate the object of interest from other objects. Once the attributes are identified, the attributes may be stored in a storage system to be compared against other objects in second video data.

15 Claims, 6 Drawing Sheets

MANAGEMENT OF ATTRIBUTES ASSOCIATED WITH OBJECTS IN VIDEO DATA

RELATED APPLICATIONS

This application hereby claims the benefit of and priority to U.S. Provisional Patent Application No. 63/089,920, entitled "MANAGEMENT OF ATTRIBUTES ASSOCIATED WITH OBJECTS IN VIDEO DATA," filed Oct. 9, 2020, and which is hereby incorporated by reference in its entirety.

BACKGROUND

Video data can be generated in a variety of different formats to support various different applications. These different formats may include different resolutions, different frame rates, different color gradients, or some other different formatting. As the video data is generated, the data may be imported to a computing device or devices to support editing, surveillance, or other operations in association with the video data. For example, video data may be used by an organization to provide surveillance on one or more properties.

However, as video data is increased for an operation, difficulties can arise in identifying objects of interest in the video data. In particular, databases that store reference information for objects of interest may be inefficiently expanded as objects are added to the reference information. In some implementations, these issues may be compounded when a set list of attributes is associated with each of the objects, even when portions of the attributes are either not present or irrelevant in identifying the requested object.

OVERVIEW

Provided herein are systems, methods, and software to manage attributes associated with objects in video data. In one implementation, a video processing service obtains video data from a video source and identifies an object of interest in the video data. Once identified, the video processing service identifies attributes for the object of interest from one or more frames of the video data that satisfy one or more uniqueness criteria and stores the attributes for the object of interest in the storage system.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
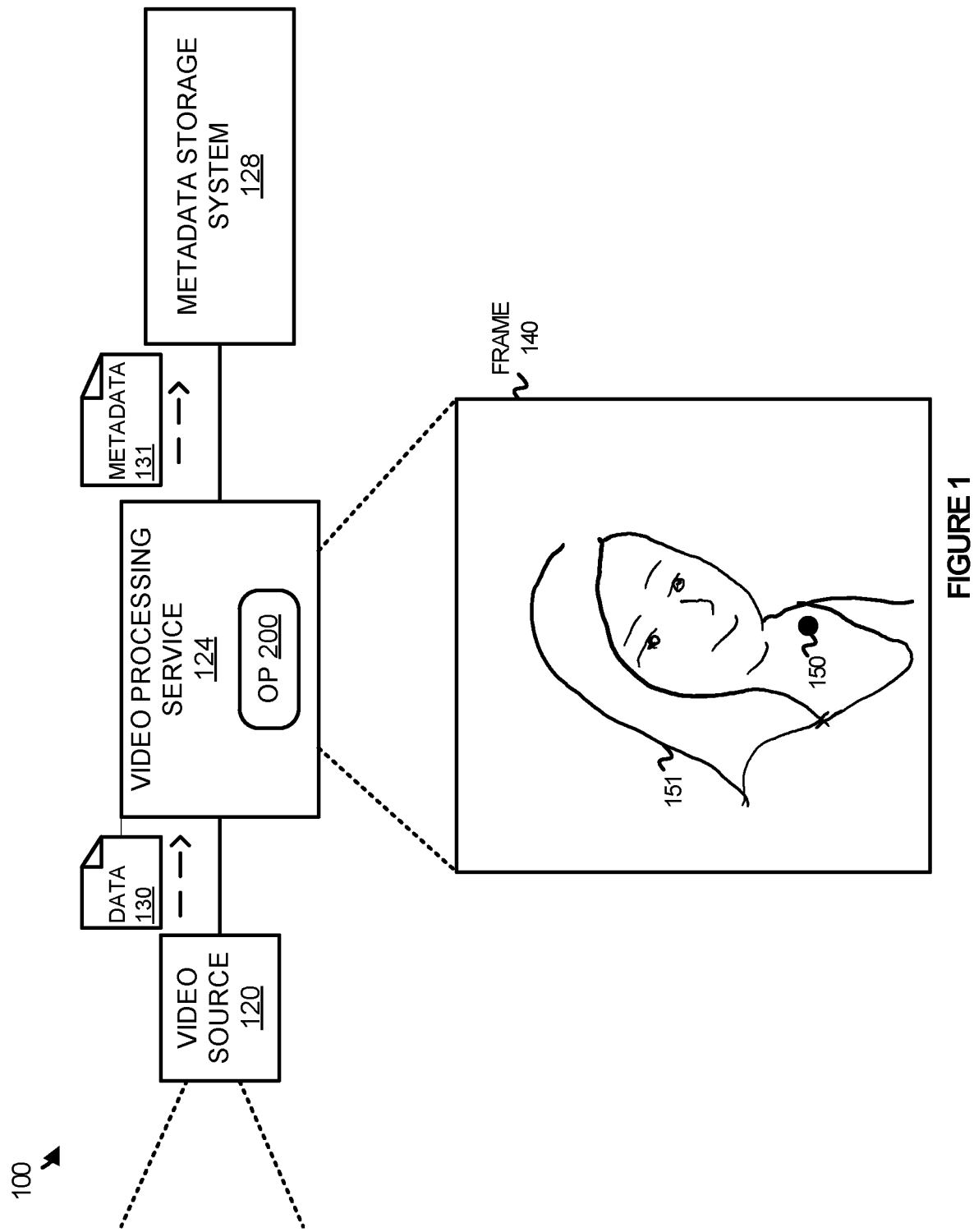
FIG. 1 illustrates a computing environment to manage attributes associated with objects in video data according to an implementation.

FIG. 1 illustrates a computing environment 100 to manage attributes associated with objects in video data according to an implementation. Computing environment 100 includes video source 120, video processing service 124, metadata storage system 128, and example frame 140. Computing environment 100 further includes video data 130 that is provided by source 120 and metadata 131 that is generated by video processing service 124. Sample frame 140 of image data 130 includes attributes 150-151, which are representative of physical attributes associated with an object in frame 140. Video processing service 124 provides operation 200 that is described further in FIG. 2.

In operation, video processing service 124 obtains video data 130 from video source 120. Video source 120 may comprise a video storage device, such as a hard disk drive, a solid state drive, an SD card, or some other storage device, or may comprise a camera, which may comprise a stand-alone device, a smartphone, or some other camera device. As video data 130 is obtained from video source 120, video processing service 124 may identify an object of interest. In some implementations, the object of interest may be defined by a user via a user interface, wherein the user may select an object in one or more frames of the video data for further processing. In other implementations, the object of interest may be identified automatically by video processing service 124, wherein video processing service 124 may be configured to identify a particular type of object, such as a person or a vehicle. The object of interest for future processing by video processing service 124 may comprise a person, vehicle, product, or some other object identifiable from video data 130.

After an object of interest is identified, video processing service 124 may identify attributes associated with the object of interest from one or more frames in the video data. The attributes may each correspond to the color, shape, and/or location of a physical attribute for the object. Referring to the example in frame 140, attributes for a person may include hair color represented by attribute 151, location, shape, size, and/or color of a birthmark or scar represented by attribute 150. In some implementations, the attributes may further correspond to mannerisms or motions associated with the object of interest. As the attributes are identified, video processing service 124 may determine whether each of the identified attributes satisfies one or more uniqueness criteria, which can be used to uniquely identify the object of interest in relation to other objects of interest. For example, an attribute that provides the hair color of a person may not be as unique as an attribute that indicates the location of a scar on a person's body. In some examples, limited storage space may be available in metadata storage system 128 for each object of interest. Consequently, the attributes identified for each of the objects may only include the attributes that can most uniquely identify the object of interest in relation to other objects of interest, while any remaining attributes that do not satisfy the uniqueness criteria are not stored in storage system 128 as metadata 131. Additionally, as additional video data is obtained relating to the object of interest, the attribute metadata associated with the object of interest may be updated in metadata storage system 128. For example, if each object of interest is limited to twenty attributes, new attributes that are identified in later processed video data may be used to replace one or more existing attributes in metadata storage system 128 so long as the new attributes can provide more uniquely identifiable characteristics associated with the object of interest.

In some implementations, once attributes for objects are stored in metadata storage system 128, video processing service 124 may receive a request to determine whether any previously identified objects match an object in second video data. Video processing service 124 may identify attributes associated with the object in the second video data and compare the identified attributes to attributes for objects in metadata storage system 128. If the attributes for the object in the second video data meet matching criteria to an object in metadata storage system 128, a display notification may be generated that indicates the relationship between the two objects. For example, the object in the second video data may comprise a person and attributes identified about the person in the second video data may be used to search metadata storage system 128. If a possible match is identified from comparing the attributes, then a display may be generated for the person stored in metadata storage system 128, wherein the display may indicate a name of the person, the matching attributes that triggered the identification of the match, an image or video segment for the person from metadata storage system 128, or some other information related to the comparison.

Figure 2:
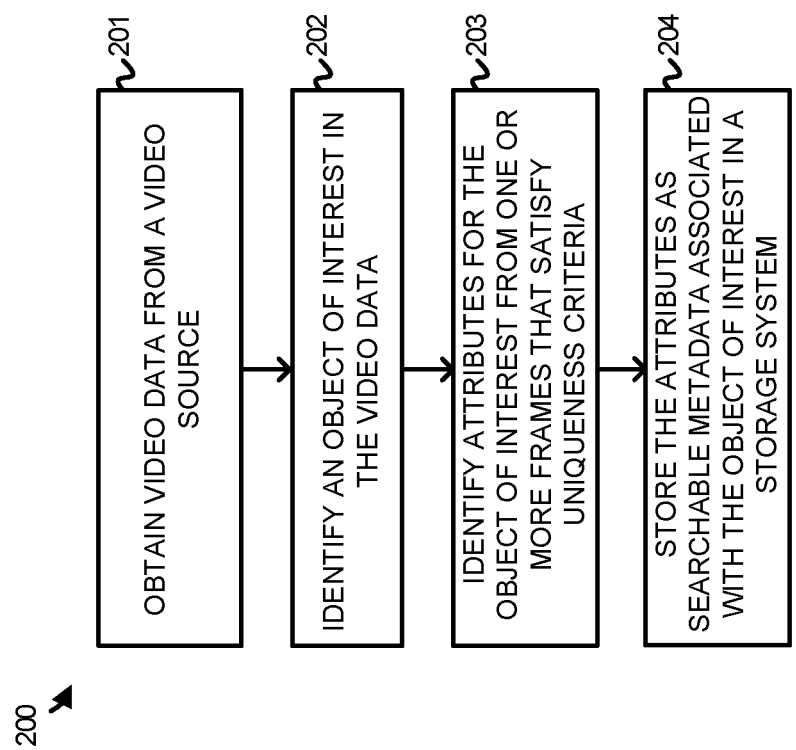
FIG. 2 illustrates an operation of a video processing service to manage attributes associated with objects in video data according to an implementation.

FIG. 2 illustrates an operation 200 of a video processing service to manage attributes associated with objects in video data according to an implementation. The steps of operation 200 are referenced parenthetically in the paragraphs that follow with references to elements of computing environment 100 of FIG. 1.

As depicted, operation 200 includes obtaining (201) video data from a video source and identifying (202) and object of interest in the video data. In some implementations, a user may select the object and provide the object with an identifier, such as a name, a brand, or some other unique identifier for the object of interest. The user selection may be provided via a user interface, wherein the user may select an object in a frame of the video data. In other examples, video processing service 124 may automatically identify an object of interest, such as a person or product in the video data.

Once the object of interest is identified, operation 200 further identifies (203) attributes for the object of interest from one or more frames of the video data that satisfy one or more uniqueness criteria and stores the (204) attributes for the object of interest in a storage system. In some implementations, video processing service 124 may identify first attributes from the frames of the video data. As the first attributes are identified, video processing service 124 may apply one or more uniqueness criteria to the attributes, which may comprise minimum or maximum uniqueness values, storage constraints for the attributes associated with the object of interest, or some other criteria to determine what subset of the first attributes should be stored in metadata storage system 128. The attributes may comprise physical attributes, such as the location, color, shape, and the like of a physical attribute, or may comprise a motion or mannerism associated with the object of interest. In some examples, video processing system 124 may determine uniqueness values associated with each of the attributes, wherein the uniqueness values may correspond to the ability for the attribute to distinguish the current object of interest from other objects, the ability to identify the attribute from video data, or some other factor. Referring to frame 140, while a hair color attribute represented by attribute 151 may provide identifiable information associated with a person, a birthmark or mole on the person represented by attribute 150 may provide a more uniquely identifiable trait of the person.

In some implementations, each object of interest may be allocated a maximum amount of storage in metadata storage system 128 for attributes associated with the object of interest. As a result, a subset of attributes may be selected from the first attributes to store in metadata storage system 128 based on the uniqueness of the attributes. In some examples, the uniqueness scores associated with each of the attributes may be prioritized, such that attributes with the better uniqueness scores are favored over other attributes with lesser uniqueness scores. Video processing service 124 may then populate an entry for the object of interest in metadata storage system 128 using the higher priority attributes until the storage space for the object of interest is full. In allocating the uniqueness values, the value may be based on preferences from an administrator associated with video processing service 124, based on a comparison to other identified attributes, based on a knowledge base for objects similar to the object of interest, or based on some other factor.

In some examples, video processing service 124 may attempt to identify attributes in order of uniqueness from the video data. For example, video processing service 124 may first attempt to identify a first physical feature or features and add the attribute to the entry for the object if the feature or features are identifiable in the video data, then move to subsequent physical features until the maximum amount of storage for the object of interest is populated. The ordering for physical feature or features associated with an object may be provided by an administrator, may be based on attributes for other objects stored in metadata storage system 128, or may be based on some other factor.

In some implementations, the attributes associated with an object of interest may be updated as additional video data is obtained by video processing service 124. For example, when second video data is obtained by video processing service 124 for the object of interest, video processing service 124 may initiate an operation to identify any new attributes that satisfy uniqueness criteria to replace existing attributes for the object in metadata storage system 128. In some examples, when new attributes are identified a uniqueness score may be allocated to the new attributes and compared to the attributes existing in metadata storage system 128. If the score is better for the new attribute, the new attribute may replace an existing attribute.

As the attributes are stored for objects in metadata storage system 128, video processing service 124 may compare attributes for a new object to the attributes of the stored objects. Based on the comparison, video processing service 124 may identify one or more objects in metadata storage system 128 that satisfy similarity criteria to the new object and generate a visual notification summarizing the similarity. The visual notification may include an identifier for the one or more objects, the attributes that matched, or some other information for a user of video processing service 124.

Figure 3:
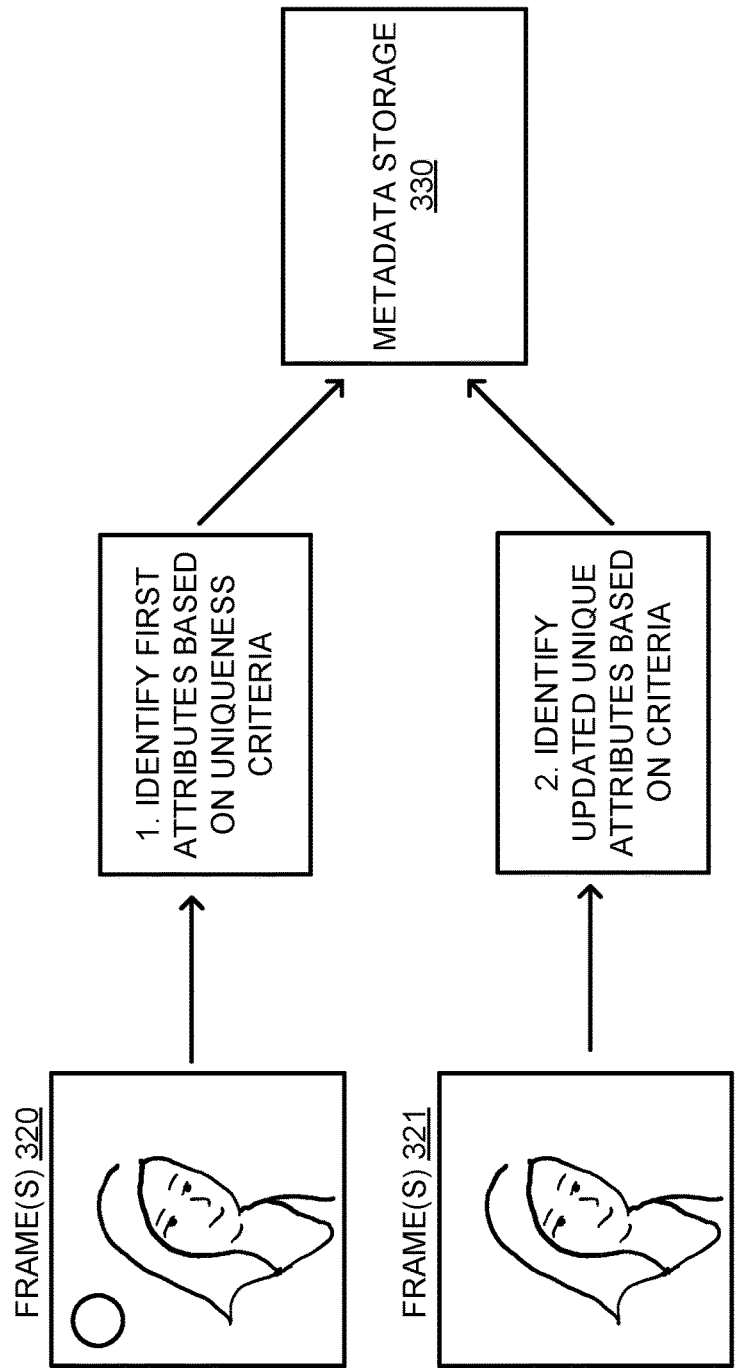
FIG. 3 illustrates an operational scenario of updating attributes associated with an object based on video data according to an implementation.

FIG. 3 illustrates an operational scenario 300 of updating attributes associated with an object based on video data according to an implementation. Operational scenario includes frame(s) 320 and frame(s) 321, and further includes metadata storage 330.

In operation, a video processing system obtains frame(s) 320 during a first time period and identifies an object of interest in frame(s) 320. Once the object of interest is identified, the video processing service identifies, at step 1, first unique attributes of the first object of interest. In some examples, the video processing service may identify a plurality attributes by identifying physical and movement attributes associated with the object of interest. As the plurality of attributes are identified, the video processing system will determine whether each of the plurality attributes comprises an attribute that satisfies one or more uniqueness criteria. In some examples, each of the attributes may be allocated a uniqueness value, which can be based on a variety of factors. The factors may include the ability to differentiate the object of interest from other objects, the ability to identify the attribute in the video data, or some other factor. In some examples, the uniqueness value may be allocated at least in part by an administrator, wherein an administrator may define rules associated with the uniqueness values and the types of attributes identified for an object. In some examples, the uniqueness values may be based at least in part on the attributes for objects already stored in the storage system, wherein attributes that are already identified for other objects may comprise a lower uniqueness value for the attribute identified for the new object.

In some implementations, metadata storage 330 may include a maximum amount of storage space per object, limiting the number of attributes that can be stored in metadata storage 330. As a result, the criteria for an attribute to be identified for an object may be based at least in part on the uniqueness of the attribute and the available storage in metadata storage 330. In some examples, the video processing service may store attributes with the highest uniqueness values in metadata storage 330 until the available storage space for the object is occupied.

After first unique attributes are stored in metadata storage 330, the video processing service may obtain second frame(s) 321 and identify, at step 2, any updated attributes associated with the object of interest. For example, a user may identify additional video data with one or more frames that include the object of interest. Once the object is identified in frame(s) 321, the video processing service may determine whether any new attributes are identified that should be used to update the object entry in metadata storage 330. In some examples, the video processing service may identify uniqueness values associated with each of the new attributes from frame(s) 321 and compare the newly identified attributes to the attributes from frame(s) 320 that are stored in metadata storage 330. If the new attributes satisfy criteria to replace the attributes already stored in metadata storage 330, then the new attributes may replace the previously stored attributes. In some implementations, rather than replacing existing attributes, the new attributes may be added to metadata storage 330.

Figure 4:
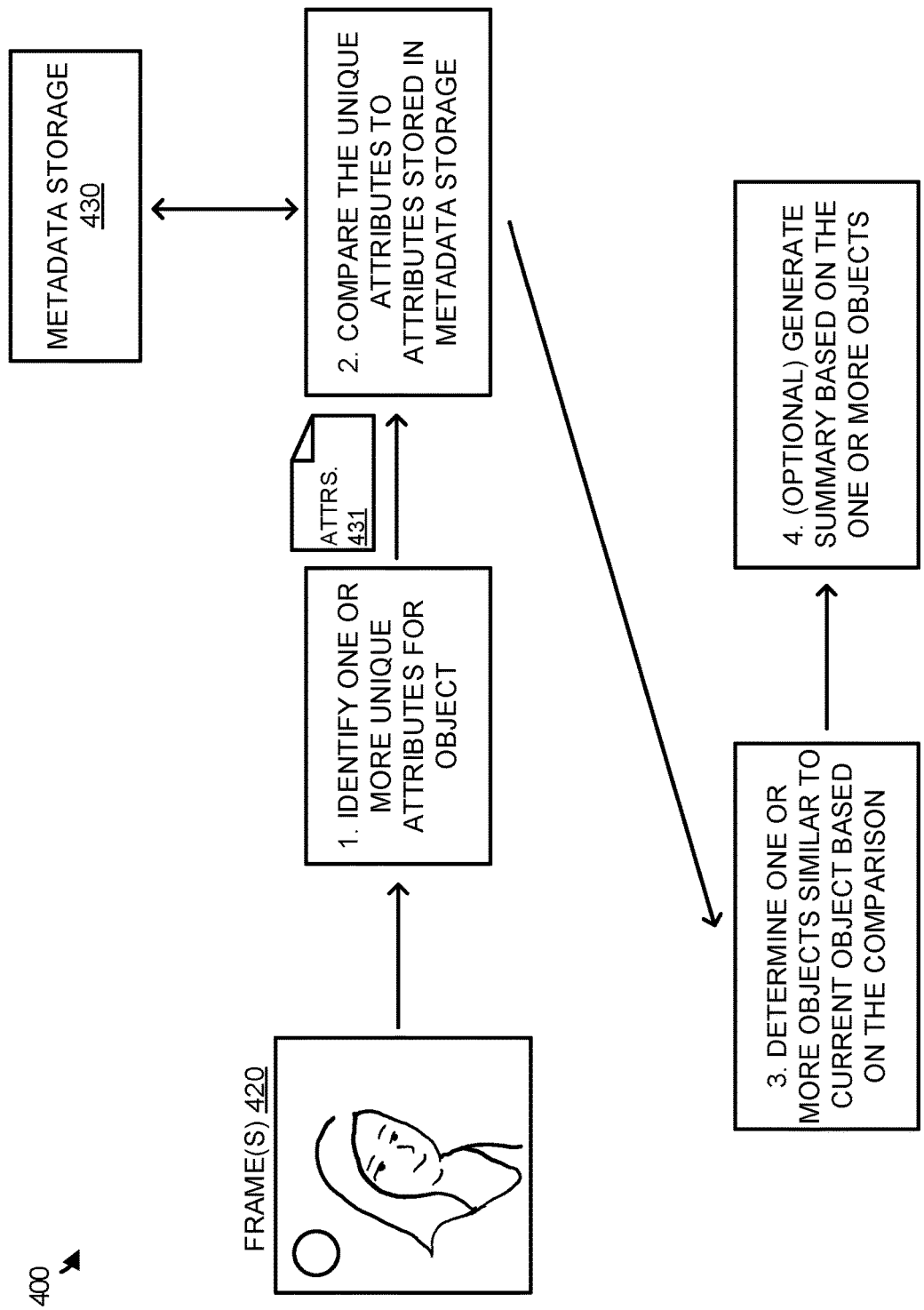
FIG. 4 illustrates an operational scenario of identifying related objects to a current object in video data according to an implementation.

FIG. 4 illustrates an operational scenario 400 identifying related objects to a current object in video data according to an implementation. Operational scenario 400 includes frame(s) 420, attributes 431, and metadata structure 430.

In operation, a video processing service may obtain video data corresponding to objects and may store attributes associated with each of the objects in metadata storage 430. The attributes selected may be based on the uniqueness of the attribute to distinguish the object from other objects stored in metadata storage 430. In some examples, the attributes may be selected based on a uniqueness score allocated to each of the objects, wherein the score may be based on the uniqueness of the attribute, the ability to identify the attribute in video data, or some other factor. Once the scores are identified, the video processing service may determine whether the score for the attribute satisfies criteria to be stored in metadata storage 430.

Here, once attributes are stored for objects, the video processing service may obtain frame(s) 420 of video data and identify, at step 1, one or more attributes associated with an object of interest in frame(s) 420. The video processing service may then compare, at step 2, the attributes for the object of interest to attributes of other objects stored in metadata storage 430. The video processing service may then determine, at step 3, one or more objects similar to the current object based on the comparison. In some implementations, to expedite the comparison, the video processing service may identify attributes that most uniquely identify the object of interest in frame(s) 420 using the aforementioned uniqueness values. The most unique attributes may then be used to search metadata storage 430 for objects that share at least a portion of the attributes. If the current object of interest shares enough attributes with another object in metadata storage 430 to satisfy criteria, then the other object may be identified as similar to the current object. In some examples, the criteria may include a minimum number of matching attributes, a percentage of matching attributes, or some other criteria for matching a current object of interest to objects in metadata storage 430.

Once the similar objects are identified, the video processing service may generate, at step 4, a summary based on the one or more identified objects. In some examples, the summary may indicate identifiers for the one or more objects, the attributes that matched between the object of interest and the one or more objects, or some other information associated with the similar objects. For example, if the object of interest were a person, a summary may indicate a name of the matched person from metadata storage 430 and may indicate the attributes that triggered the identification of the person from metadata storage 430.

Figure 5:
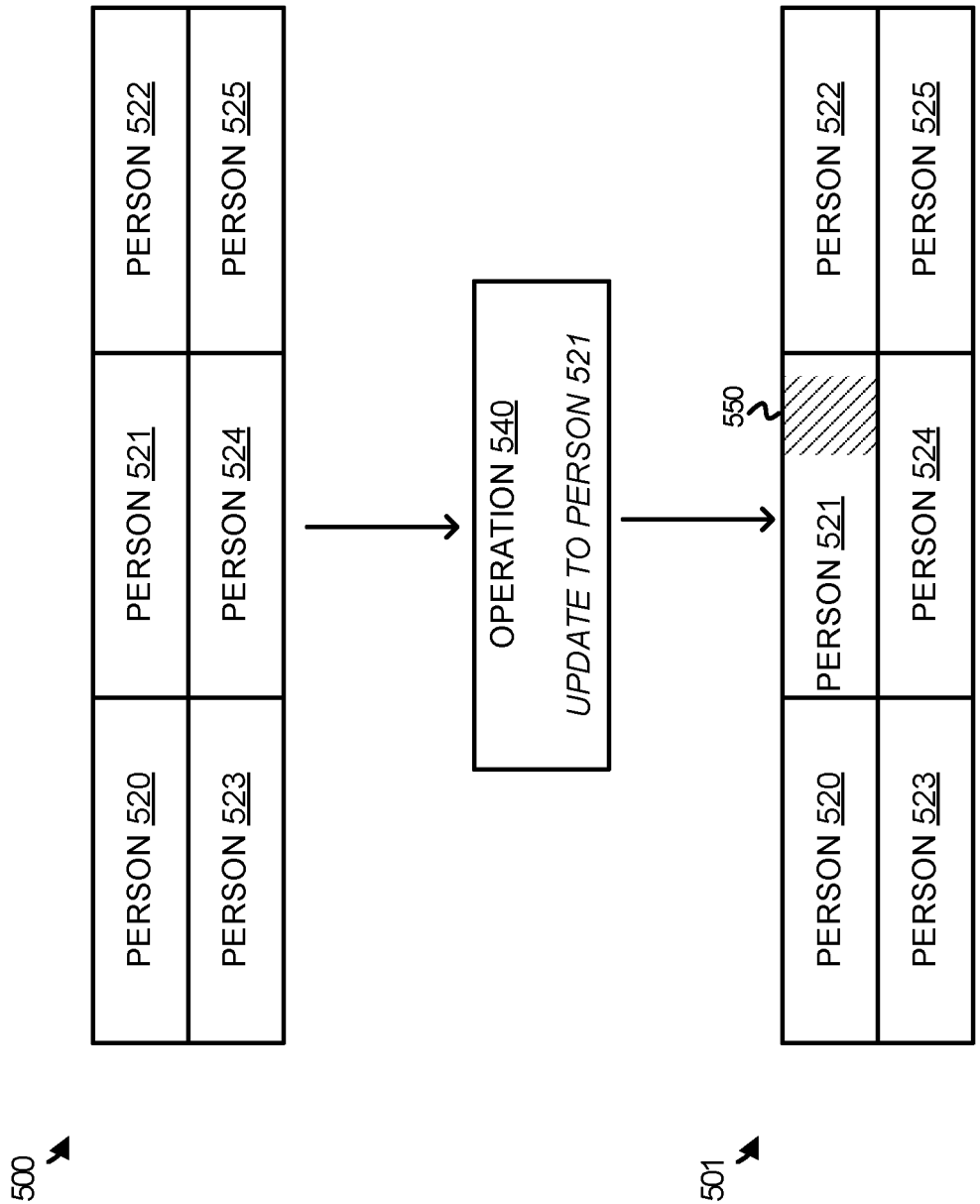
FIG. 5 illustrates an overview of updating an attribute data structure according to an implementation.

FIG. 5 illustrates an overview of updating an attribute data structure according to an implementation. FIG. 5 include data structure 500 and updated data structure 501 that is transformed via operation 500.

In operation, a storage system may maintain attributes associated with a plurality of objects. Here, the objects in data structure 500 includes attributes for persons 520-525, wherein the attributes may be used to identify each person in relation to other persons in video data. The attributes may describe physical attributes of the person, such as eye color, tattoos, birth marks, facial structure, or some other information about a person. During the operation of a video processing service, the video processing service may obtain additional video data related to person 521. In response to obtaining the video data, the video processing service may implement operation 540 to update person 521 based on any new attributes identified for person 521 and implement modification 550 to person 521.

In some implementations, when the new video data is obtained, the video processing service may identify new attributes and determine whether the new attributes satisfy uniqueness criteria to replace other attributes already stored in data structure 500. In satisfying the criteria, the video processing service may determine a uniqueness value for each new attribute and compare the uniqueness value to uniqueness values for other attributes stored in the data structure. The uniqueness value may be based on the ability to differentiate the attributes of the current object from the attributes of other objects, the ability to identify the new attribute in video data, or some other factor. For example, a tattoo may be favored as an attribute over hair color for a person. If the uniqueness value for a new attribute satisfies the criteria to replace a current attribute, then operation 540 may replace the current attribute with the new attribute to generate updated data structure 501.

In some examples, each person in the data structure may be allocated a maximum amount of storage for attributes associated with the person. As a result, attributes associated with the user may be replaced when a new attribute is identified for the person. For example, first video data may provide one angle of the person or object, while second video data may provide a second angle of the person or object. Consequently, once the video data from the second angle is identified, one or more attributes from the second angle may be used to replace one or more angles from the first angle.

Figure 6:
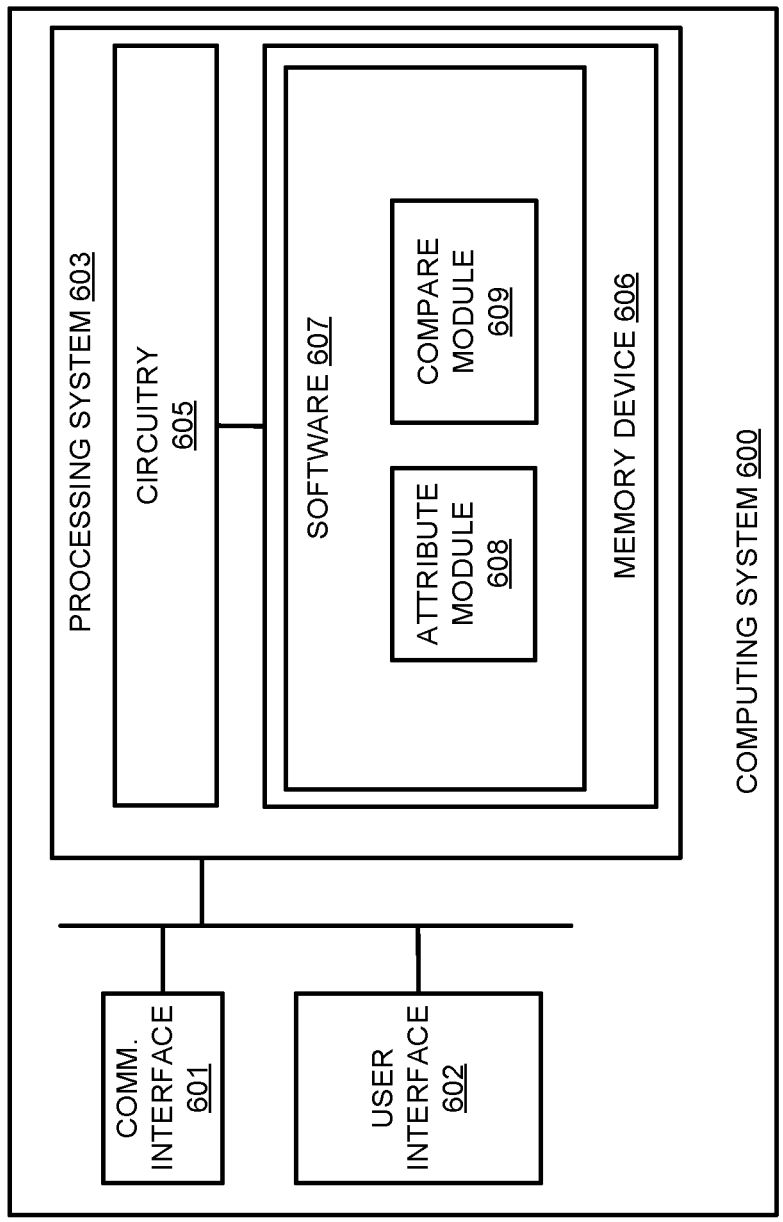
FIG. 6 illustrates a computing system to manage attributes associated with objects of interest in video data according to an implementation.

FIG. 6 illustrates a computing system 600 to manage attributes associated with objects of interest in video data according to an implementation. Computing system 600 is representative of any computing system or systems with which the various operational architectures, processes, scenarios, and sequences disclosed herein for an end computing element, such as computing element 110 of FIG. 1. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, communication interface 601 may be configured to communicate with one or more cameras or video data storage systems to obtain video data. Communication interface 601 may further be configured to one or more client computing systems to provide a user interface for the video data and information processed from the video data.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. In some implementations, user interface 602 may include an image capture device to capture video data. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes attribute module 608 and compare module 609, although any number of software modules may provide the same operation. Operating software 607 may further include an operating system, utilities, drivers, network interfaces, applications, or some other type of software. When executed by processing circuitry 605, operating software 607 directs processing system 603 to operate computing system 600 as described herein. In at least one implementation, operating software 607 directs processing system 603 to provide at least operation 200 of FIG. 2.

In one example, attribute module 608 directs processing system 603 to obtain video data from a video source and identify an object of interest in the video data, wherein the object of interest may be specified via user input or may be identified based on the type of object. For example, an object of interest may comprise a vehicle. Once the object of interest is identified, attribute module 608 directs processing system 603 to identify attributes for the object of interest from one or more frames of the video data that satisfy one or more uniqueness criteria. Once identified, attribute module 608 may store the attributes in a storage system, wherein the storage system stores attributes associated with a plurality of objects.

In some examples, when an attribute is identified for an object the attribute may be allocated a uniqueness value, wherein the uniqueness value may be based on the ability to differentiate the object of interest from attributes of other objects in a storage system, the ability to identify the attribute from video data, or some other factor. For example, a unique tattoo may be allocated a first uniqueness value, while hair color may be allocated a second uniqueness value. Based on the uniqueness values, attribute module 608 may direct processing system 603 to identify a subset of attributes that satisfy criteria, wherein the criteria may comprise a minimum or maximum uniqueness value, a maximum amount of storage space associated with the object of interest in the storage system, or some other criteria. For example, the attributes with the best uniqueness values or highest priority uniqueness values may be used to fill an entry associated with the object of interest until the storage space available for the object is filled. Any attributes that do not satisfy the criteria, will not be stored in the entry for the object.

In some implementations, the entry for the object of interest may be dynamic. In particular, as new video data is processed, new attributes for the object of interest may be identified. Each new attribute may be allocated a uniqueness value that can be compared to the values for attributes already stored in association with the object. If the new attribute provides a uniqueness value favored over an existing uniqueness value, then the new attribute may be used to replace the current value, or the least favored attribute stored for the object.

As the attributes are stored in the storage system, in some examples alongside the video data, compare module 609 may direct processing system 603 to identify a second object in second video data. Once identified, attributes may be identified for the second object and compared against attributes stored in the storage system for other objects. If attributes for the second object and an object in the storage system meet one or more criteria (i.e., a number of attributes match), compare module 609 may generate a notification that indicates the match and may further indicate the attributes that match. However, if a match to an object is not identified, the second object may have its attributes added to the storage system as a new object.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   obtaining video data from a video source;
   identifying an object of interest in the video data;
   identifying attributes for the object of interest from one or more frames of the video data that satisfy one or more uniqueness criteria, wherein identifying the attributes for the object of interest from the one or more frames of the video data that satisfy the one or more uniqueness criteria comprises:
     identifying first attributes for the object of interest;
     determining a uniqueness score associated with each of the first attributes, wherein the uniqueness score is based at least on an ability to distinguish the attribute from second attributes associated with one or more other objects;
     prioritizing the first attributes based on the uniqueness scores; and
     selecting a subset of the prioritized first attributes as the attributes based on an amount of available storage for the object of interest in a storage system; and
   storing the attributes for the object of interest in the storage system.

2. The method of claim 1, wherein the object of interest comprises a person.

3. The method of claim 2, wherein the attributes each comprise a location, color, and/or shape of a physical attribute associated with the person.

4. The method of claim 1 further comprising:
   obtaining second video data;
   identifying one or more updated attributes for the object of interest from one or more frames of the second video data that satisfy the uniqueness criteria; and
   updating the attributes with the one or more updated attributes in the storage system.

5. The method of claim 4, wherein updating the attributes with the one or more updated attributes comprises replacing at least one attribute in the attributes with the one or more updated attributes.

6. The system of claim 1 further comprising:
   obtaining second video data;
   identifying a second object of interest in the second video data;
   identifying second attributes for the second object of interest from one or more frames of the second video data;
   determining that the second attributes are related to attributes for one or more objects in the storage system; and
   generating a notification indicates a relationship between the one or more objects and the second object.

7. A computing apparatus comprising:
   a storage system;
   a processing system operatively coupled to the storage system;
   program instructions stored on the storage system that, when executed by the processing system, direct the computing apparatus to:
     obtain video data from a video source;
     identify an object of interest in the video data;
     identify attributes for the object of interest from one or more frames of the video data that satisfy one or more uniqueness criteria, wherein identifying the attributes for the object of interest from the one or more frames of the video data that satisfy the one or more uniqueness criteria comprises:
       identifying first attributes for the object of interest;
       determining a uniqueness score associated with each of the first attributes, wherein the uniqueness score is based at least on an ability to distinguish the attribute from second attributes associated with one or more other objects;
       prioritizing the first attributes based on the uniqueness scores; and
       selecting a subset of the prioritized first attributes as the attributes based on an amount of storage for the object of interest in the storage system; and
     store the attributes for the object of interest in the storage system.

8. The computing apparatus of claim 7, wherein the object of interest comprises a person.

9. The computing apparatus of claim 8, wherein the attributes each comprise a location, color, and/or shape of a physical attribute associated with the person.

10. The computing apparatus of claim 8, wherein the attributes comprise at least a mannerism associate with the person.

11. The computing apparatus of claim 7, wherein the program instructions further direct the computing apparatus to:
    obtain second video data;
    identify one or more updated attributes for the object of interest from one or more frames of the second video data that satisfy the uniqueness criteria; and
    update the attributes with the one or more updated attributes in the storage system.

12. The computing apparatus of claim 11, wherein updating the attributes with the one or more updated attributes comprises replacing at least one attribute in the attributes with the one or more updated attributes.

13. The computing apparatus of claim 7, wherein the program instructions further direct the computing apparatus to:
    obtain second video data;
    identify a second object of interest in the second video data;

identify second attributes for the second object of interest from one or more frames of the second video data;
determine that the second attributes are related to attributes for one or more objects in the storage system; and
generate a notification indicates a relationship between the one or more objects and the second object.

14. An apparatus comprising:

a storage system; and program instructions stored on the storage system that, when executed by a processing system, direct the processing system to:
obtain video data from a video source;
identify an object of interest in the video data;
identify attributes for the object of interest from one or more frames of the video data that satisfy one or more uniqueness criteria, wherein identifying the attributes for the object of interest from the one or more frames of the video data that satisfy the one or more uniqueness criteria comprises:
identifying first attributes for the object of interest;
determining a uniqueness score associated with each of the first attributes, wherein the uniqueness score is based at least on an ability to distinguish the attribute from second attributes associated with one or more other objects;
prioritizing the first attributes based on the uniqueness scores; and
selecting a subset of the prioritized first attributes as the attributes based on an amount of available storage for the object of interest in the storage system; and
store the attributes for the object of interest in the storage system.

15. The apparatus of claim 14, wherein the object of interest comprises a person, and wherein the attributes each comprise a location, color, and/or shape of a physical attribute associated with a person.

* * * * *